United States Patent
Shashi et al.

(10) Patent No.: US 9,946,983 B1
(45) Date of Patent: Apr. 17, 2018

(54) RULE-BASED ELECTRONIC WORKFLOW PROCESSING

(71) Applicant: Amazon Technologies, Inc., Seattle, WA (US)

(72) Inventors: Bhushan Chandramouli Shashi, Bangalore (IN); Amol Wanjari, Bangalore (IN); Srikar Appalaraju, Bangalore (IN); VS Kiran Devaguptapu, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 348 days.

(21) Appl. No.: 14/736,097

(22) Filed: Jun. 10, 2015

(51) Int. Cl.
*G06Q 10/00* (2012.01)
*G06Q 10/06* (2012.01)

(52) U.S. Cl.
CPC ............... *G06Q 10/06316* (2013.01)

(58) Field of Classification Search
CPC .......................................... G06Q 10/00–50/00
USPC ............................................... 705/7.11–7.42
See application file for complete search history.

(56) References Cited

U.S. PATENT DOCUMENTS

| | | | | |
|---|---|---|---|---|
| 5,848,393 A * | 12/1998 | Goodridge | ......... | G06Q 10/0633 703/6 |
| 5,999,911 A * | 12/1999 | Berg | ....................... | G06F 17/50 705/7.13 |
| 6,065,009 A * | 5/2000 | Leymann | ............... | G06Q 10/06 |
| 6,424,948 B1 * | 7/2002 | Dong | ................. | G06Q 10/0631 705/7.12 |
| 6,826,579 B1 * | 11/2004 | Leymann | ............... | G06Q 10/06 717/103 |
| 7,065,493 B1 * | 6/2006 | Homsi | ................... | G06Q 10/06 705/7.26 |
| 7,451,432 B2 * | 11/2008 | Shukla | ...................... | G06F 8/36 717/105 |
| 7,873,422 B2 * | 1/2011 | Dumas | ...................... | G06F 8/10 700/29 |
| 8,103,536 B2 * | 1/2012 | Green | .................... | G06Q 10/06 705/7.27 |
| 8,108,868 B2 * | 1/2012 | Toub | ..................... | G06F 9/5038 718/100 |
| 2002/0040312 A1 * | 4/2002 | Dhar | ........................ | A61J 9/00 705/7.26 |
| 2003/0149714 A1 * | 8/2003 | Casati | .................... | G06Q 10/10 718/100 |
| 2005/0021540 A1 * | 1/2005 | McKee | .................. | G06Q 10/10 |

(Continued)

OTHER PUBLICATIONS

Müller, Robert, Ulrike Greiner, and Erhard Rahm. "Agentwork: a workflow system supporting rule-based workflow adaptation." Data & Knowledge Engineering 51.2 (2004): 223-256.*

(Continued)

*Primary Examiner* — Alan S Miller
(74) *Attorney, Agent, or Firm* — Baker & Hostetler LLP

(57) ABSTRACT

A workflow processing system may receive a representation of one or more objects corresponding to the current state of a workflow. A rule may be mapped to one or more activities of the workflow. The rule may comprise an any-of clause, an all-of clause, and a none-of clause. Each clause may contain zero or more conditions that are evaluated with respect to the current state of the workflow. When each of the any-of, all-of, and none-of clauses evaluates to true, the rule may be satisfied and the activities to which the rule is mapped are performed.

20 Claims, 9 Drawing Sheets

(56) References Cited

U.S. PATENT DOCUMENTS

| | | | | |
|---|---|---|---|---|
| 2005/0043982 A1* | 2/2005 | Nguyen | ............ | G06Q 10/06316 |
| | | | | 705/7.26 |
| 2006/0282473 A1* | 12/2006 | Horrocks | ............... | G06Q 10/10 |
| 2009/0089078 A1* | 4/2009 | Bursey | ................. | G06Q 10/101 |
| | | | | 705/300 |
| 2012/0078677 A1* | 3/2012 | Green | .................... | G06Q 10/06 |
| | | | | 705/7.26 |
| 2013/0212234 A1* | 8/2013 | Bartlett | .............. | G06Q 10/0633 |
| | | | | 709/220 |
| 2014/0229221 A1* | 8/2014 | Shih | ................. | G06Q 10/06313 |
| | | | | 705/7.23 |

OTHER PUBLICATIONS

Casati, Fabio, et al. "Deriving active rules for workflow enactment." Database and expert systems applications. Springer Berlin/Heidelberg, 1996.* van Der Aalst, Wil MP, et al. "Workflow patterns." Distributed and parallel databases 14.1 (2003): 5-51.*

Jang, Julian, et al. "An event-driven workflow engine for service-based business systems." Enterprise Distributed Object Computing Conference, 2006. EDOC'06. 10th IEEE International. IEEE, 2006.*

Brambilla, Marco. "LTL formalization of BPML semantics and visual notation for linear temporal logic." Politecnico di Milano (2005).*

Aitken, Stuart. "An ontological account of action in processes and plans." Knowledge-Based Systems 18.6 (2005): 295-305.*

* cited by examiner

RULE-BASED ELECTRONIC WORKFLOW PROCESSING

BACKGROUND

Electronic workflows typically involve orchestrated sequences of activities performed to accomplish a task. The execution of a workflow by a computer may involve operations such as storing and retrieving records, processing data, invoking services, and so on. A typical example of an electronic workflow may be represented by a flowchart, with various elements of the flowchart representing the activities to be performed in order to process the workflow. The flowchart representing the workflow might lay out a precise order in which the activities are to be performed. It might also contain various elements representing control-flow, such as conditional branches, repeating loops, and so forth. For more complex workflows, the flowchart could become very complex. The programming of a corresponding workflow may present various difficulties due to this complexity.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1:
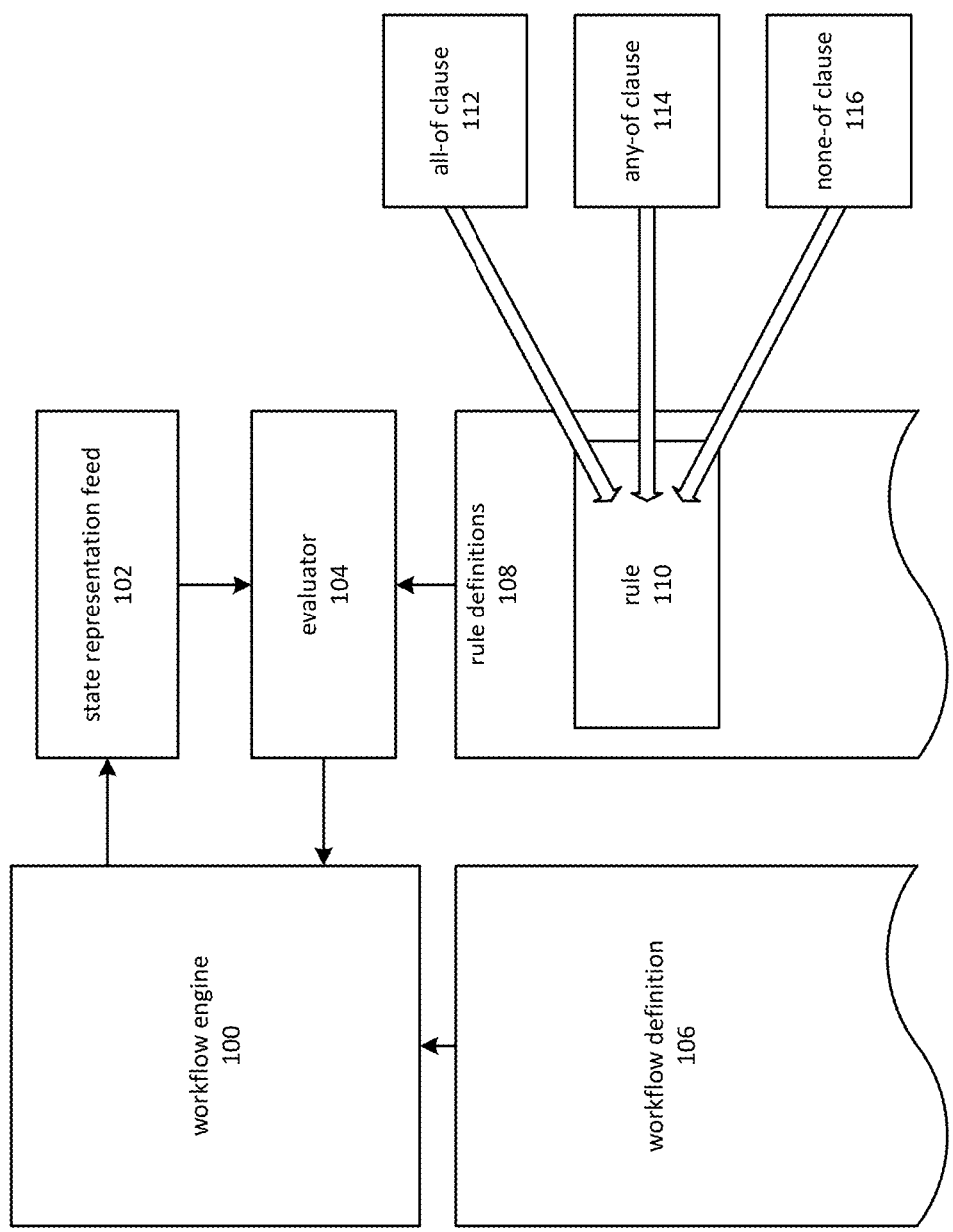
FIG. 1 is a block diagram depicting an example of a system for processing workflow definitions based on representations of object states and a collection of rules.

An electronic workflow processing system may use a rule-based technique to determine which activities of a workflow are performed and the order in which the activities are performed. The rule-based technique may allow electronic workflows to be defined with a reduced number of control-flow statements. The rule-based technique may also allow control-flow decisions to be more configurable than conventional workflow definitions.

An electronic workflow, which may be referred to herein as a workflow, describes computer-initiated activities that accomplish a task. The activities that make up a workflow may be described as component steps related to the accomplishment of the task. A workflow may be defined to include a variety of activities, not all of which may be necessary in every circumstance. For example, the electronic processing of a customer service request might involve creating a database record to represent the request and generating an email notification to a customer service representative. In some cases, an additional activity such as notifying a supervisor might be called for. In others, accomplishing the task might involve retrieving data related to the customer service request.

Typically, control-flow decisions in a workflow involve constructs such as if . . . then . . . else statements, while loops, case statements, and so forth. These constructs may, however, add complexity to the definition of a workflow. In addition, if the workflow is extended to accommodate new circumstances, the use of control-flow constructs may necessitate significant changes to the workflow definition.

Aspects of the present disclosure may involve configurable rule definitions that are applied by an evaluator module to a current state of a workflow. If new circumstances cause a need for the workflow to be altered, the rules definitions may be altered, rather than the workflow definition. In some instances, new rule definitions may be added while leaving existing rules in place, allowing for extensions to the behavior of a workflow without altering its behavior in ordinary circumstances.

A rule definition may comprise three clauses: the any-of clause, the all-of clause, and the none-of clause. Additional clauses may also be included. Regarding the any-of, all-of, and none-of clauses, they may each contain conditions that apply to their respective clauses. The any-of clause is satisfied when any one of its conditions are true, the all-of clause is satisfied when all of its conditions are true, and the none-of clause is satisfied when none of its conditions are true. A rule may combine these three clauses using logical AND operators.

Rules may be defined using partial representations of objects. A partial representation of an object may consist of some subset of the properties of an object, with associated values or ranges of values. For example, an any-of clause might be specified as "any-of X," where "X" is a partially defined object. "X" might be defined to have a property "M" with a value "2." If that was the case, the "any-of X" clause would evaluate to true if the state of the workflow contained at least one object of the same type as "X" with a property "M" equal to "2."

A rule may be associated with one or more activities of the workflow. A rule may, for example, specify an activity to be performed if the rule is satisfied, e.g., by having its constituent clauses evaluate to true. A rule might also specify an activity to be performed when the rule is not satisfied. In some cases, a rule might be used to control the behavior of an activity. For example, an activity might have within it various branches or conditions which might be influenced by the behavior of the rule. In such cases, the workflow engine may be send an indication that influences evaluation of the branch or condition.

The rules may be evaluated with respect to the current state of the workflow. For example, at the start of a workflow the rules might be evaluated with respect to the initial state of the workflow. After the first activity is performed, the rules might be evaluated with respect to the state of the workflow after the first activity. Each application of the rules might result in one or more additional activities being satisfied, until an end condition is reached and the workflow stops.

The rules may be applied by an evaluator module that receives a representation of the workflow's state. The state representation may comprise one or more representations of objects used in processing the workflow. For example, a workflow might utilize an object corresponding to a customer record. In some cases, the state representation might correspond to the all of the object's properties. In others, a portion of the object—for example those properties used to evaluate a collection of rules—might be incorporated into a state representation of the object.

FIG. 1 is a block diagram depicting an example of a system for processing workflow definitions based on representations of object states and a collection of rules. A workflow engine 100 may comprise one or more software modules executed on one or more computing nodes. The workflow engine 100 may interpret a workflow definition 106 to process various activities defined by the workflow definition 106.

An activity can include instructions for performing operations on one or more computing nodes. Typically, the activity may correspond to a particular step that may be performed to accomplish a task. For example, a task might involve publishing an electronic book to an e-commerce store. In order to perform the task, a number of activities might be performed. These activities might include formatting the electronic book, updating a database to refer to the electronic book, determining that the electronic book has been approved for publishing by retrieving a record from a database, and so on. These examples are intended to be illustrative, and should not be viewed as limiting the scope of the present disclosure to the enumerated examples.

Conventional approaches to workflow processing may involve explicit specification of the order in which the various activities are performed. For example, a workflow definition might include an "if . . . then . . ." expression and/or a "while . . . do . . ." loop. This approach may, however, involve a significant degree of complexity, particularly where a large number of such control-flow definitions are specified.

Aspects of the present disclosure may involve a workflow definition 106 in which sets of activities may be defined without including explicit definitions regarding the order in which the activities may be performed. Although the workflow definition 106 may include some explicit definitions of the order in which activities are to be performed, the workflow definition 106 may also define activities that are not associated with an explicit order.

A collection of rule definitions 108 may define various rules, such as the rule 110 depicted in FIG. 1. The rule 110 may contain various clauses, including an all-of clause 112, an any-of clause 114, and a none-of clause 116. The rule 110 may be satisfied if these three clauses are satisfied. In other words, a result for all-of clause 112 may be combined with a result for any-of clause 114 and a result for none-of clause 116 by logical "AND" operators. The combination of all-of clause 112, any-of clause 114, and none-of clause 116 may permit rule 110 to be expressed without the use of operators for which precedence is ambiguous.

In some embodiments, the clauses 112, 114, and 116 may be defined using partial representations of an object. The partial representations may indicate templates of objects that match those in the workflows state for the purpose of evaluating a rule. For example, a partial representation of an object might, if used in an all-of clause, indicate that all objects of the same type in the workflow's state must conform to the partial representation in order for the all-of rule to evaluate to true.

The rule 110 may be evaluated by evaluator 104. The evaluator 104 may comprise a software module executing on one or more computing nodes. Input to the evaluator may comprise rule definitions 108 and information indicative of the rule 110. The evaluator 104 may receive the rule definitions from, for example, a storage device on which a file containing the rule definitions 108 is stored. Input to the evaluator may also comprise a representation of a current state of a workflow. The state information may be received from a state representation feed 102.

The state information received by evaluator 104 may comprise representations of one or more objects associated with a state of the workflow. The state may correspond to the current state of the workflow. In some cases the state may correspond to a prior state of the workflow. Evaluator 104 may, in some instances, evaluate rule 110 with respect to a prior state of the workflow, or with respect to a plurality of prior states of the workflow.

Representations of objects associated with a state of the workflow may be formed by state representation feed 102. In various embodiments, state representation feed 102 may be combined with evaluator 104 and/or workflow engine 100. The arrangement depicted by FIG. 1 is intended to illustrate an example of a system that incorporates various aspects of the present disclosure, and should not be construed as limiting the disclosure to the depicted arrangement.

A representation of an object may be formed by state representation feed 102 to include properties that are associated with the object. The properties included in the state representation need not be all of the properties of the object. For example, an object used in one or more the activities defined by workflow definition 106 and processed by workflow engine 100 might comprise properties "A," "B," and "C." The state representation feed 102 may form a representation of the object that comprises information indicative of the values of properties "B" and "C" (for example) with respect to the current state, or to a prior state. In some instances, a subset of methods associated with the object may be operable on the representation. Typically, these methods may be those that operate on the subset of properties included in the representation. In some cases, partial representations of objects may be used in the definition of rules. If so, the partial representations used in the rule definitions may be used to determine the subset of properties included in the state representation formed by feed 102.

Figure 2:
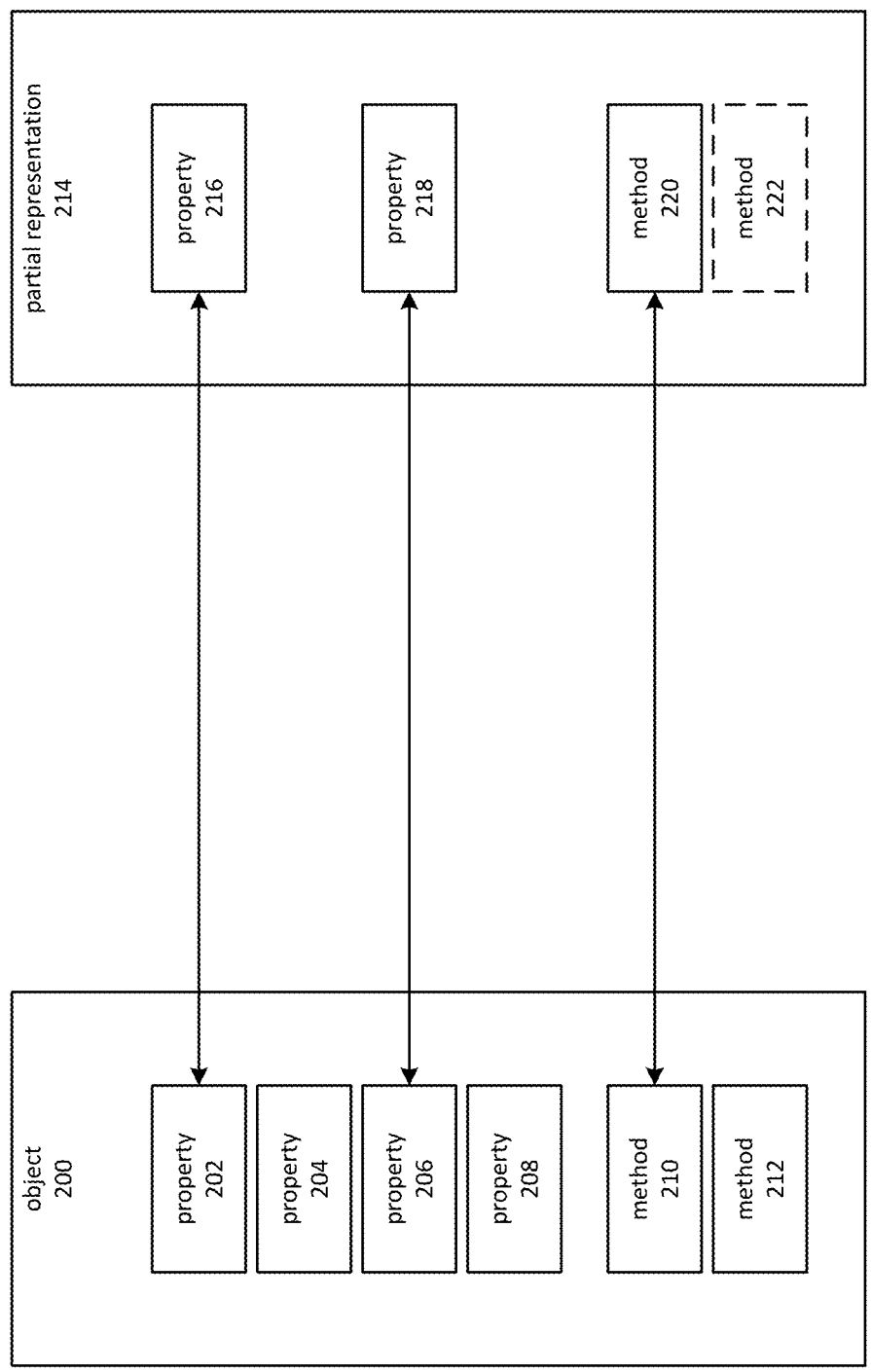
FIG. 2 is a block diagram depicting an example of a partial representation of an object.

FIG. 2 is a block diagram depicting an example of a partial representation of an object. An object 200 may be associated with an activity performed within a workflow. Activities, when executed by a workflow engine, may be associated with a current state that may be represented by objects. An object can include one or more properties, such as the properties 202, 204, 206, and 208 as depicted by FIG. 2. A property may have one or more values associated with it.

In an embodiment, a partial representation 214 of an object may be formed to comprise a subset of properties associated with the object 200. Conditions of a rule may be evaluated based on the partial representation.

A partial representation 214 may comprise a subset of the properties 202-208 that are depicted in FIG. 2 as being associated with object 200. For example, property 202 may correspond to property 216 of the partial representation 214. Similarly, property 206 may correspond to property 218. Correspondence, in this case, may refer to the name or identity of a property in object 200 corresponding to the name or identity of a property in a partial representation 214.

In some embodiments, methods that are operable when performed with respect to the object 200 may also be operable when performed with respect to the partial representation 214. For example, method 210 of object 200 may also be operable as method 220 applied with respect to the partial representation 214. Method 220 might operate using various properties of the partial representation 214, such as property 216 or property 218. Another method 222 might correspond to a method 212 on object 200, but might not be operable. This may be the case, for example, when a property depended on by method 212 of the object and a corresponding method 222 of the partial representation 214 is not available in the partial representation 214.

The properties included in the partial representation of the object 214 may be associated with values or ranges of values that may be used as part of a rule. A property of the partial representation 214 may match an object, such as object 200, that might be represented in a workflow state. The match may occur when the value of a corresponding property in the object 200 matches the value, or falls within the range of values, specified in the partial representation 214. Similar approaches may be applied with respect to methods. For example, a partial representation may be said to match an object when a method invoked on the partial representation returns the same result as a corresponding method in the corresponding workflow state object.

Figure 3:
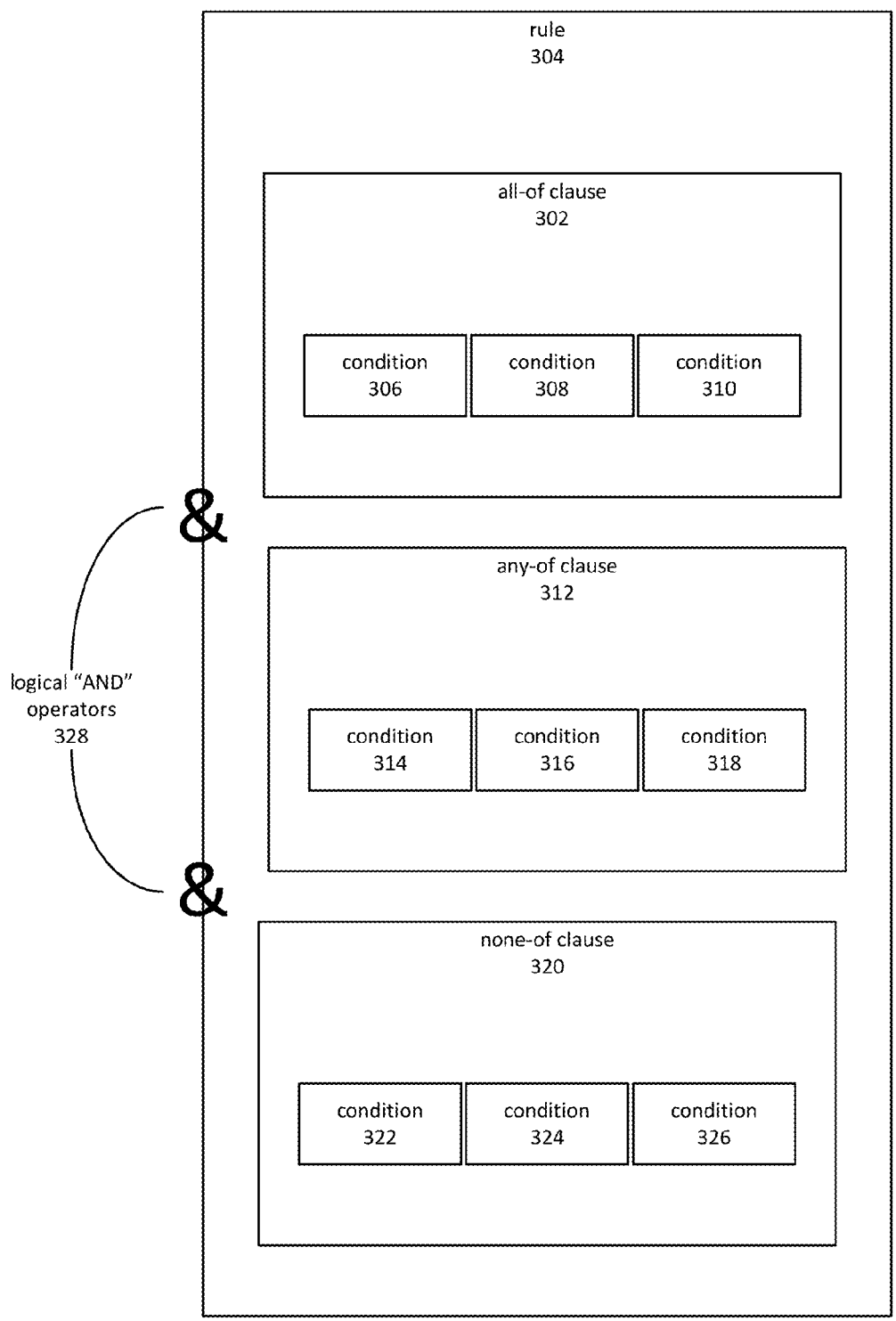
FIG. 3 depicts an example of a rule definition comprising an all-of clause, an any-of clause, and a none-of clause.

FIG. 3 depicts an example of a rule definition comprising an all-of clause, an any-of clause, and a none-of clause. A rule 304 may be defined in a variety of ways, including extensible markup language ("XML") files, domain-specific language files, programmatic construction through an application programming interface ("API"), and so on.

The rule 304 may contain clauses that are joined by logical "AND" operators 328. The clauses may include an all-of clause 302, an any-of clause 312, and a none-of clause 320. The clauses may each contain zero or more conditions that can be evaluated with respect to a representation of a workflow state, such as a representation of one or more objects that correspond to the workflow state.

An all-of clause 302 may comprise zero or more conditions, such as the depicted conditions 306, 308, and 310. If the all-of clause 302 contains no conditions, it may evaluate to true. If there are one or more conditions, the all-of clause 302 may evaluate to true if all of the specified conditions evaluate to true. For example, if each of conditions 306, 308, and 310 evaluate to true then the all-of clause 302 evaluates to true. If any of the conditions 306, 308, or 310 were to evaluate to false, then the all-of clause 302 would also evaluate as false.

An any-of clause 312 may comprise zero or more conditions, such as the depicted conditions 314, 316, and 318. If the any-of clause 312 contains no conditions, it may evaluate to true. If there are one or more conditions, such as conditions 314, 316, or 318, the any-of clause 312 may evaluate to true if at least one of the conditions evaluates to true. For example, if the condition 314 evaluates to true while the other conditions 316 and 318 evaluate to false, the any-of clause 312 may evaluate to true. If the condition 314 were to also evaluate to false in addition to the other conditions 316 and 318, then the any-of clause 314 may evaluate to false.

A none-of clause 320 may comprise zero or more conditions, such as the depicted conditions 322, 324, and 326. If the none-of clause 320 contains no conditions, it may evaluate to true. If the none-of clause 320 has one or more conditions, it may evaluate to true if none of those conditions evaluates to true. For example, if each of its conditions 322, 324, and 326 evaluates to false, then the none-of-clause 320 may evaluate to true. If any of the conditions 322, 324, or 326 evaluates to true, then the none-of-clause of rule 304 may evaluate to false.

The rule 304 may evaluate to true if each of the all-of clause 302, the any-of clause 312, and the none-of clause 320 evaluate to true, based on application of the logical "AND" operators 328 to these clauses. Similarly, if any of the all-of clause 302, the any-of clause 312, or the none-of clause 320 evaluates to false, then rule 304 evaluates to false.

A condition may include a partial representation of an object, expressions, functions, name-value pairs, and other representations of logical conditions or procedures. A condition may be evaluated with respect to representations of one or more objects corresponding to a state of the workflow. Evaluating a condition may involve determining a result of the logical expressions or procedures associated with the conditions, using the representations of the objects while evaluating or executing the logical expression or the procedure. In some embodiments, evaluating a condition may involve matching partial representations of objects specified in various conditions, such as conditions 306-310, of rule 314 to representations of objects corresponding to a state of the workflow.

Figure 4:
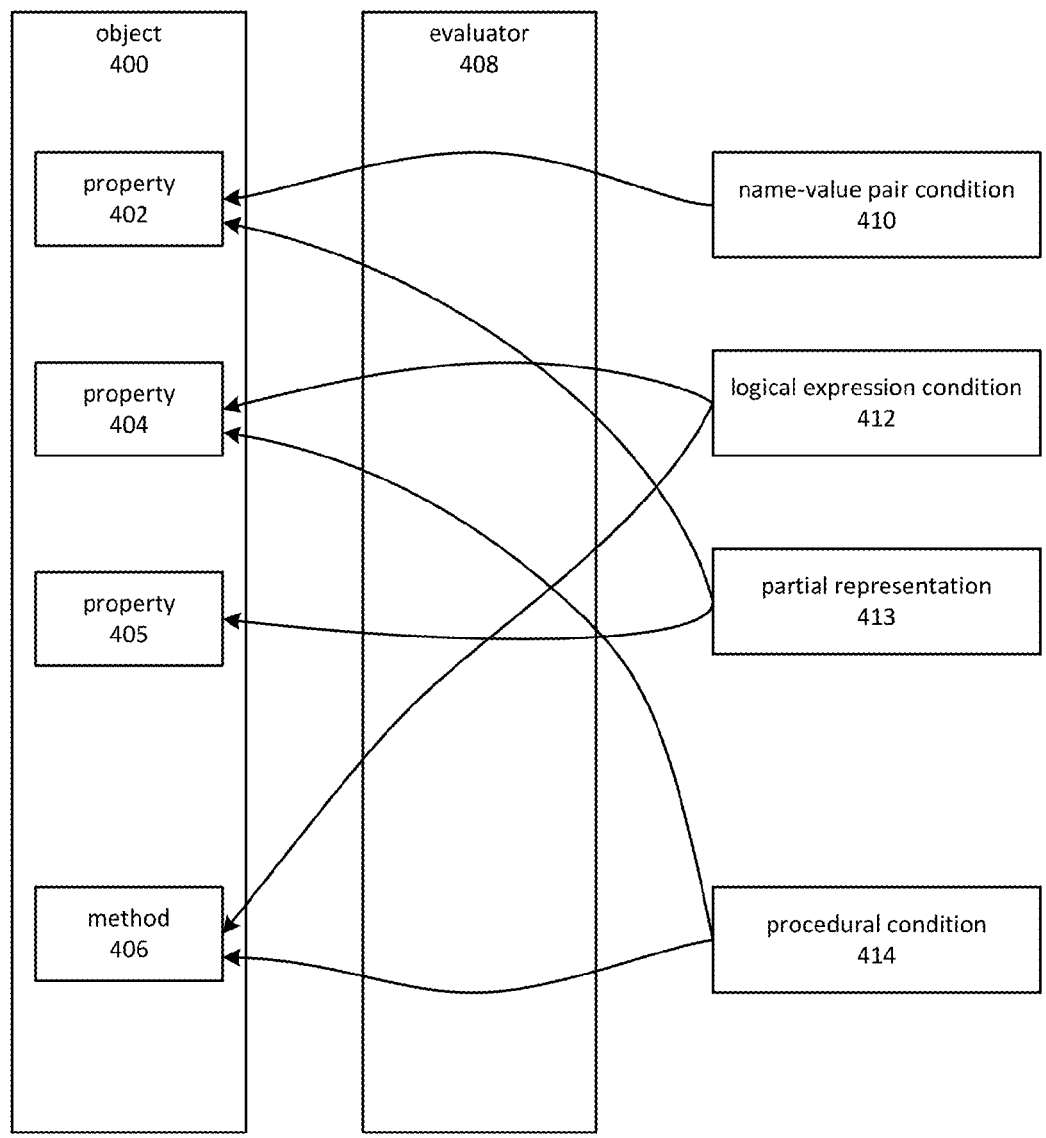
FIG. 4 is a block diagram depicting examples of evaluating conditions with respect to a representation of an object.

FIG. 4 is a block diagram depicting examples of evaluating conditions with respect to a representation of an object. FIG. 4 depicts various examples of conditions that might be associated with clauses of a rule. A rule might comprise one or more of the depicted types of conditions.

A name-value pair condition 410 might be a representation, in the memory of a computer (not shown), of an association between a property name and a value, such as "A=10." The condition might be evaluated, by evaluator 408, by referring to a corresponding property 402 of an object 400. The object 400 may be representative of a corresponding object in a workflow state. If the value of the corresponding property 402 is 10, the condition may evaluate to true. The evaluator 408 may process the name-value pair condition 410 using various techniques. In some instances, the evaluator 408 may parse the name-value pair condition 410 and use code introspection or reflection to identify a property that corresponds to the name pair. The value of the property may then be compared to the value of the name-value pair condition 410.

A logical expression condition 412 may be a representation, in the memory of a computer, of a logical expression such as "B>5." A logical expression might also contain various sub-conditions joined by logical operators such as "AND," "OR," or "XOR." However, the use of these expressions may be avoided in some cases by using the all-of, any-of, and none-of clauses of a rule. The logical expression condition 412 may refer to a property 402, or to a method 406. The evaluator 408 may evaluate logical expression condition 412 using various techniques, such as by parsing the logical expression condition 412 and using code introspection or reflection to locate a corresponding object or method within object 400. The evaluator 408 might, for example, use this technique to obtain a value of a property 404 referenced in logical expression condition 412 and compare that value for its conformations to the rest of the expression. For example, if the logical expression condition 412 is "B>5" and property 404 of object 400 corresponds to "B," then the logical expression condition 412 may evaluate to true if the value of property 404 is greater than five, and false otherwise.

A partial representation 413 may be a representation, in a memory of a computer, of a subset of object properties. The partial representation 413 may be associated with an object type, class, or other category-defining information. One or more property names and corresponding values (or ranges of values) may also be associated with the partial representation 413. For example, the partial representation 413 might contain two property names corresponding to the names of properties 404 and 405 of object 400. The partial representation 413 might match the object 400 if the values or ranges of values specified in the partial representation 313 are consistent with the corresponding values of properties 404 and 405.

A procedural condition 414 may be evaluated in a similar manner. Non-limiting examples of a procedural condition 414 include "method( )>5" and "method( )" The evaluator 408 may parse the procedural condition and use code introspection or reflection techniques to locate the corresponding method 406 of object 400. If the result of evaluating the expression or invocation corresponds to true, the procedural condition may evaluate to true, or to false if the result does not correspond to true.

Figure 5:
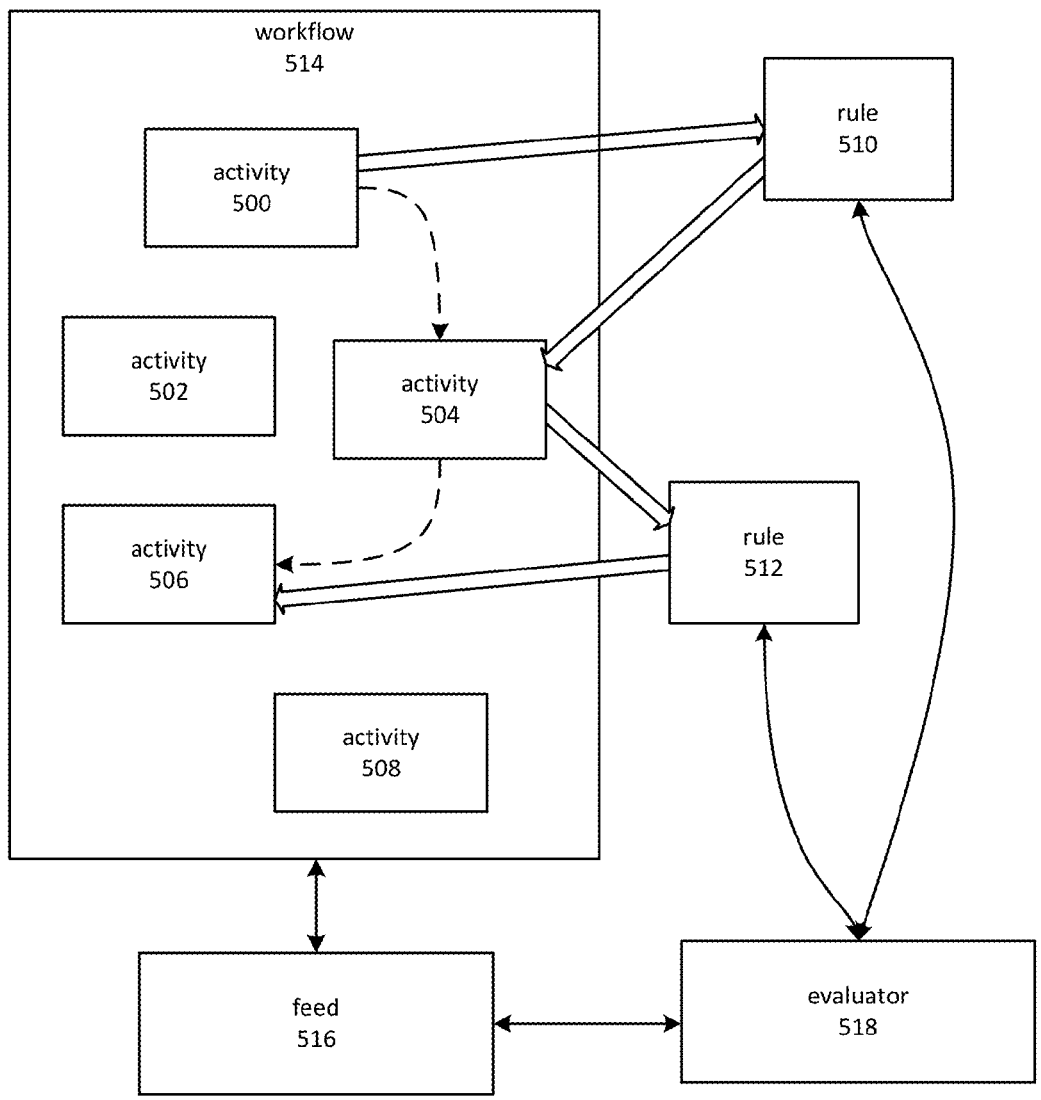
FIG. 5 is a block diagram depicting an evaluator module that selects activities to perform based on rule evaluation.

FIG. 5 is a block diagram depicting an evaluator module that selects activities to perform based on rule evaluation. A feed 516 module may extract state information from a workflow 514. The state information (not shown) may correspond to the current state of workflow execution. For example, workflow 514 may have a first set of state information associated with it in its initial state, a second state following execution of the first-performed activity 500, a third following execution of the second-performed activity 504, and so on. The state information may be representations of objects associated with the workflow or referenced by an activity. For example, the workflow 514 may have various objects associated with it globally, i.e., that may be referenced by any of the activities, and the first-performed activity 500 might modify some of those objects, as well as additional objects that it might create.

The feed 516 module may access the state information and provide it to the evaluator module 518. For example, after the initial activity 500 is performed, the feed 516 may access the state information, identify a set of objects to provide to the evaluator 518, and form a representation of those objects. The representation may, in some cases, comprise a subset of the properties associated with an object. The subset may, in some cases, be determined based at least partly on the properties that are referenced by the evaluator 518 in processing any applicable rules, such as rules 510.

Continuing the example, the evaluator 518 might then use the supplied representations of the objects to evaluate rule 510. The evaluation may proceed in a manner consistent with the various techniques described herein. Based on a result of the evaluation, the evaluator 518 may cause another activity 504 to be performed. The evaluator may select the activity to be performed based on a mapping between rule 510 and the activity. For example, rule 510 might be configured so that activity 504 is performed when rule 510 evaluates to true. It might also be the case that another activity, such as activity 502, would be performed if rule 510 evaluates to false. In various instances, a rule may be mapped to one or more activities that are to be performed when the rule is true, and may also be mapped to one or more activities that are to be performed when the rule is false.

Assuming, for example, that the rule 510 is true and that activity 504 is performed as a result, the feed 516 may then access state information from the workflow 514 and supply it to the evaluator 518. Here, the information supplied to the evaluator 518 may be representations of objects related to execution of the workflow 514 subsequent to performing activity 504. The evaluator 518 might then use this information to evaluate rule 512. Mapping from the result of applying this rule to an activity, the evaluator 518 might then cause activity 506 to be executed. Note that some of the activities, such as activities 502 and 508, may not be performed if none of the rules corresponding to their performance are every satisfied.

Figure 6:
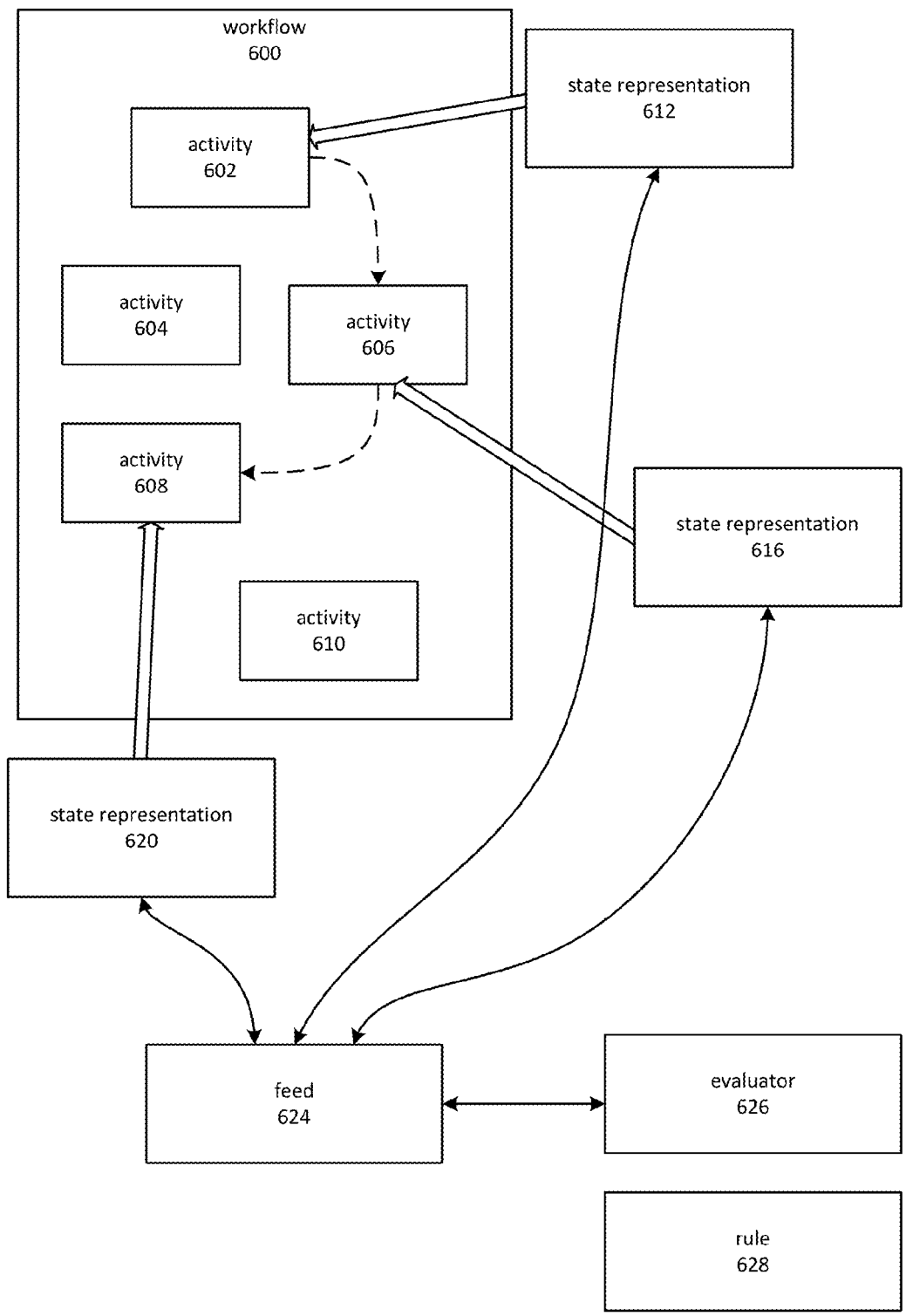
FIG. 6 is a block diagram depicting an evaluator module evaluating conditions with respect to a plurality of prior workflow states.

In some cases and embodiments, rules may be applied to various prior states of the workflow. For example, a rule might specify that a certain activity is to be performed if an error occurred during the processing of any prior activity. FIG. 6 is a block diagram depicting an evaluator module evaluating conditions with respect to a plurality of prior workflow states.

A workflow 600 may comprise various activities, such as the depicted activities 602, 604, 606, 608, and 610. For example, it might be the case that based on rule evaluation by evaluator 626, the three depicted activities 602, 606, and 608 were performed. After the first activity 602 was performed, a state representation 612 may correspond to the state of workflow 600 at that point. The state representation 612 may contain representations of one or more objects associated with workflow 600. The objects may be associated with a state of execution of workflow 600, such as the current state, or a previous state.

Similarly, state representation 616 may contain representations of objects corresponding to the state of workflow 600 after activity 606 is performed, and state representation 620 may contain representations of objects corresponding to the state of workflow 600 after activity 608 is performed.

A rule 628 might involve conditions that are applicable to a plurality of states, such as all prior states, of the workflow. The evaluator 626 may receive state representations 612, 616, and 620 from feed 624. Using this information, the evaluator 626 can evaluate the rule with respect to each of the state representations 612, 616, and 620.

Figure 7:
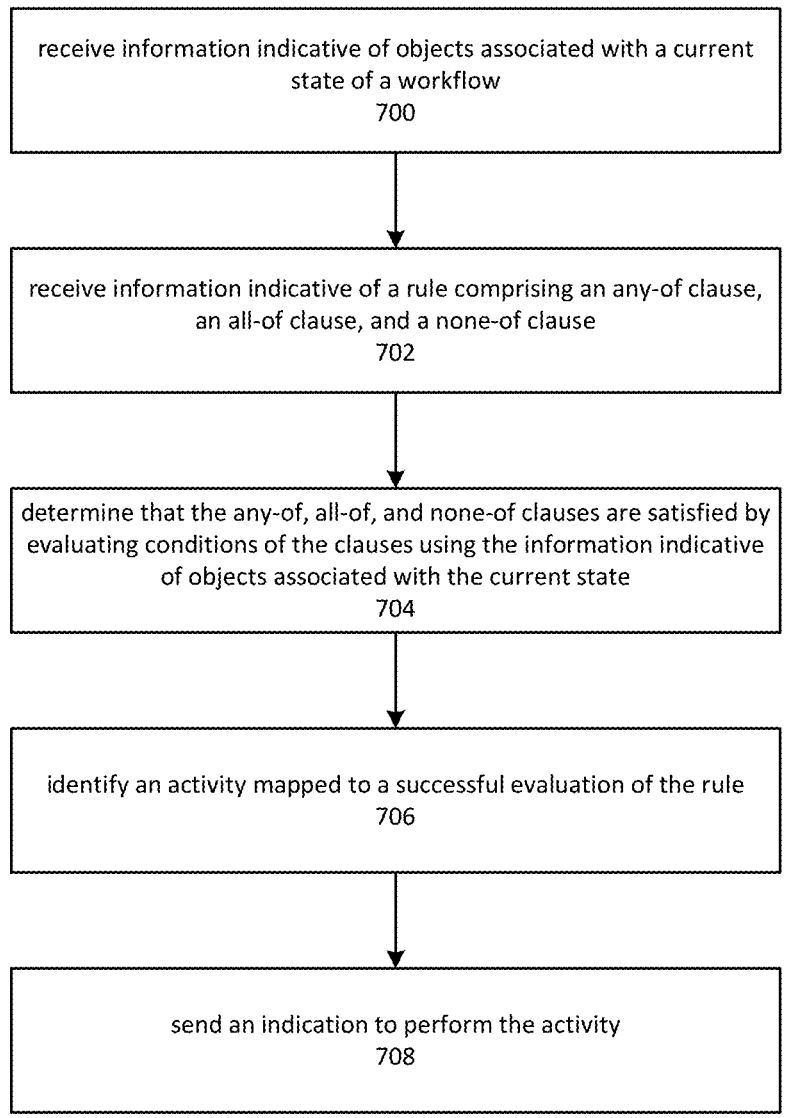
FIG. 7 is a flow diagram depicting processing of workflow definitions using representations of objects and a collection of rules.

FIG. 7 is a flow diagram depicting processing of workflow definitions using representations of objects and a collection of rules. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

Block 700 depicts an embodiment receiving information indicative of objects associated with a current state of a workflow. The embodiment might, for example, comprise the evaluator 104 module and the state representation feed 102 depicted in FIG. 1. The evaluator 104 module might receive the information from the state representation feed 102. The information indicative of objects associated with a current state of the workflow may be a representation of objects used in processing the workflow. The evaluator 104 module may receive the information through an application programming interface ("API") call, memory shared by the evaluator 104 module and the state representation feed 102, a network transmission, and so on.

The workflow may comprise various activities, some of which may be specified in the workflow in an unordered fashion. In other words, the workflow may lack explicit ordering information for at least some of its component activities. The ordering information may refer to explicit sequencing of activities as well as various control-flow constructs, such as if . . . then . . . else statements, while loops, case statements, and so forth. Note that such statements need not be entirely absent from the workflow. The subset of activities that are not associated with explicit ordering information may be those that are amenable to subsequent configuration or extension of the workflow.

Operator 702 depicts the embodiment receiving information indicative of a rule. The rule may comprise an any-of clause, an all-of clause, and a none-of clause as described herein. In various instances, some of these clauses may be no-ops due to having no conditions associated with them. The information indicative of a rule may be obtained via an API called, shared memory, network transmission, and so forth. A rule may be stored in a file and edited subsequent to the definition of the workflow or workflows to which the rule corresponds.

Embodiments may identify a rule applicable to an application, workflow, or activity based on corresponding identifiers. For example, an activity in a workflow might have a set of rules associated with it. Embodiments may determine that the rule corresponds to the current state of the workflow based on an application identifier, a workflow identifier, and an activity identifier. In some cases the workflow might not be associated with a particular application, in which case the relevant set of rules might be identified based on the workflow identifier and the activity identifier. In some instances, rule sets might be defined on an application-wide basis, a workflow-wide basis, and on a per-activity basis. Identifiers of applications, workflows, and activities may be used to establish the relevant context and identify the appropriate set of rules.

The information may take various forms, such as binary or XML files. The information may be received by retrieving it from a storage device, via network transmission, from another program module, and so on. In some cases and embodiments, the information might comprise rule definitions and clauses with conditions defined by partial object representations, name-value pairs, expressions, procedures, and so forth. Where a partial representation of an object is used to define a condition, the representation may comprise data giving a name of a property and at least one value for the property, which may include single values, sets of values, or ranges of values.

Operator 704 depicts determining that the any-of, all-of, and none-of clauses are satisfied by evaluating the conditions of each clause. The conditions may be evaluated using the information indicative of objects associated with the current state.

In an embodiment, an evaluator may evaluate a condition of a clause by at least comparing properties of a partial object representation that is associated with the condition to properties of an object associated with the current state of the workflow. The values or ranges of values for properties associated with the partial object representation may be compared to those properties associated with the current state of the workflow to determine if there is a matching object. The all-of, any-of, or none-of condition may be tested based on the matching.

Operator 706 depicts an embodiment identifying an activity that is mapped to a successful evaluation of the rule. The rules definition may include this information. Alternatively, a workflow definition may include references, in the various activities, to rules or categories of rules to which the activity should be mapped.

Based on the mapping, embodiments may determine that a rule should be executed after considering the mapping. The determination might be made, for example, by evaluator 104. Alternatively, evaluator 104 may return the results of evaluating the rule to workflow engine 100, for example. The workflow engine or the workflow itself may comprise instructions for mapping from the result to a corresponding activity.

Operation 708 depicts sending an indication to perform the activity. In some embodiments, this may comprise returning a value from a procedure, function, or service invocation, transmitting a message, and so forth. The indication may be a reference to the activity to be performed, or in some cases information about the rule and the results of applying it. Similarly, the indication might also be sent to influence the behavior of an activity. This indication might, for example, comprise information that indicates which rule or rules have been satisfied by successful evaluation of their respective clauses against the state of the workflow.

Aspects of the present disclosure may involve a computer-implemented method. The method may comprise a computing node receiving information indicative of objects associated with the state of a workflow. The workflow may comprise a plurality of activities. The order in which at least some of these activities are to be performed may be left unspecified. Leaving the order unspecified may involve excluding the activities, in the workflow definition, from an explicit sequence or from other various control-flow constructs.

The method may further comprise determining that at least one condition of a first clause of a rule is satisfied, that all conditions of a second clause of the rule are satisfied, and that no condition of a third clause of the rule is satisfied. The determination may be made by evaluating the clauses, and the conditions they contain, with respect to the one or more objects associated with the state of the workflow. This may involve evaluating the condition against a set of objects corresponding to the state of the workflow, for example by matching partial objects in the conditions to objects in the workflow state.

The method may further comprising sending an indication to perform a first activity selected from the plurality of activities, where the first activity is selected based at least in part on determining that the first, second, and third clauses are satisfied.

In some aspects, the method may further comprising determining that at least one condition of the first clause is satisfied, that all conditions of the second clause are satisfied, and that no condition of the third clause is satisfied, the determining made with respect to a second one or more objects associated with a prior state of the workflow. In some aspects, a condition may be evaluated with respect to all prior states of the workflow. Here, "all states" refers to the states of a workflow from the beginning of its present execution to its current state, although various intermediate states might be excluded. An embodiment might, for example, evaluate states as they exist at various discrete points in the execution of the workflow, such as after each activity. An example of examining all states might include the following. A workflow might involve publishing electronic books to an electronic store. All prior states of the workflow would refer to the states of the workflow from the initial stage of publishing a particular electronic book to the current stage of the workflow for the same book.

In a further aspect, the method may comprise forming a representation of an object that comprises a subset of properties associated with the object. A condition of a rule might then be evaluated based on the representation. In some cases and embodiments, one or more methods of the original object may also be operable in the representation of the object.

Figure 8:
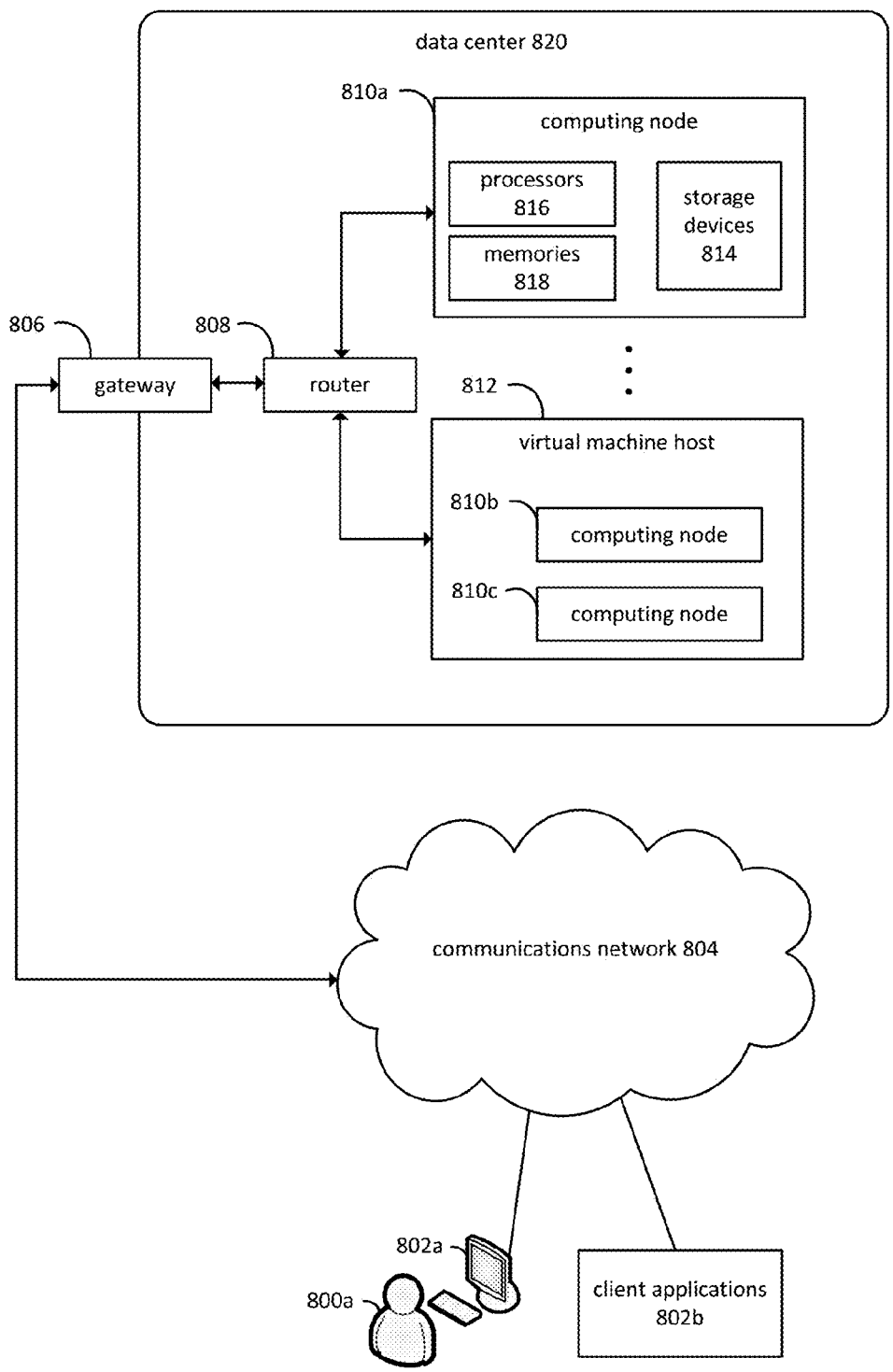
FIG. 8 is a block diagram depicting an embodiment of a computing environment in which aspects of the present disclosure may be practiced.

FIG. 8 is a diagram depicting an example of a distributed computing environment on which aspects of the present invention may be practiced. Various users 800a may interact with various client applications, operating on any type of computing device 802a, to communicate over communications network 804 with processes executing on various computing nodes 810a, 810b, and 810c within a data center 820. Alternatively, client applications 802b may communicate without user intervention. Communications network 804 may comprise any combination of communications technology, including the Internet, wired and wireless local area networks, fiber optic networks, satellite communications, and so forth. Any number of networking protocols may be employed.

Communication with processes executing on the computing nodes 810a, 810b, and 810c, operating within data center 820, may be provided via gateway 806 and router 808. Numerous other network configurations may also be employed. Although not explicitly depicted in FIG. 8, various authentication mechanisms, web service layers, business objects, or other intermediate layers may be provided to mediate communication with the processes executing on computing nodes 810a, 810b, and 810c. Some of these intermediate layers may themselves comprise processes executing on one or more of the computing nodes. Computing nodes 810a, 810b, and 810c, and processes executing thereon, may also communicate with each other via router 808. Alternatively, separate communication paths may be employed. In some embodiments, data center 820 may be configured to communicate with additional data centers, such that the computing nodes and processes executing thereon may communicate with computing nodes and processes operating within other data centers.

Computing node 810a is depicted as residing on physical hardware comprising one or more processors 816, one or more memories 818, and one or more storage devices 814. Processes on computing node 810a may execute in conjunction with an operating system or alternatively may execute as a bare-metal process that directly interacts with physical resources, such as processors 816, memories 818, or storage devices 814.

Computing nodes 810b and 810c are depicted as operating on virtual machine host 812, which may provide shared access to various physical resources, such as physical processors, memory, and storage devices. Any number of virtualization mechanisms might be employed to host the computing nodes.

The various computing nodes depicted in FIG. 8 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 9:
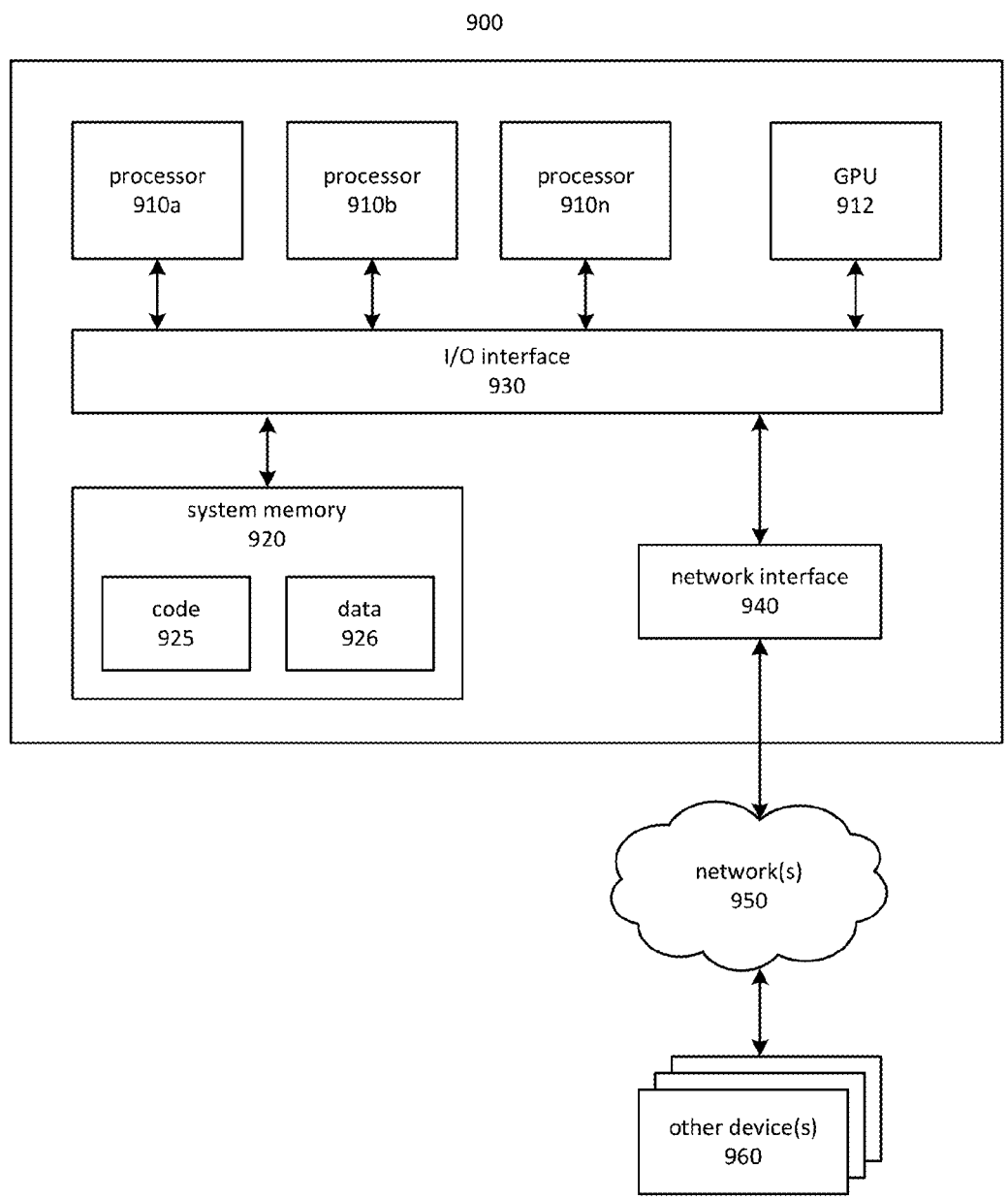
FIG. 9 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 9 depicts a general-purpose computer system that includes or is configured to access one or more computer-accessible media. In the illustrated embodiment, computing device 900 includes one or more processors 910a, 910b, and/or 910n (which may be referred herein singularly as a processor 910 or in the plural as the processors 910) coupled to a system memory 920 via an input/output ("I/O") interface 930. Computing device 900 further includes a network interface 940 coupled to I/O interface 930.

In various embodiments, computing device 900 may be a uniprocessor system including one processor 910 or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures ("ISAs"), such as the x86, PowerPC, SPARC or MIPS ISAs, or any other suitable ISA. In multiprocessor systems, each of processors 910 may commonly, but not necessarily, implement the same ISA.

In some embodiments, a graphics processing unit ("GPU") 912 may participate in providing graphics rendering and/or physics processing capabilities. A GPU may, for example, comprise a highly parallelized processor architecture specialized for graphical computations. In some embodiments, processors 910 and GPU 912 may be implemented as one or more of the same type of device.

System memory 920 may be configured to store instructions and data accessible by processor(s) 910. In various embodiments, system memory 920 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 920 as code 925 and data 926.

In one embodiment, I/O interface 930 may be configured to coordinate I/O traffic between processor 910, system memory 920, and any peripherals in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect ("PCI") bus standard or the Universal Serial Bus ("USB") standard, for example. In some embodiments, the function of I/O interface 930 may be split into two or more separate components, such as a north bridge and a south bridge, for example. Also, in some embodiments some or all of the functionality of I/O interface 930, such as an interface to system memory 620, may be incorporated directly into processor 910.

Network interface 940 may be configured to allow data to be exchanged between computing device 900 and other device or devices 960 attached to a network or networks 950, such as other computer systems or devices, for example. In various embodiments, network interface 940 may support communication via any suitable wired or wireless general data networks, such as types of Ethernet networks, for example. Additionally, network interface 940 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 920 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 900 via I/O interface 930. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 900 as system memory 920 or another type of memory. Further, a computer-accessible medium may include transmission media or signals, such as electrical, electromagnetic or digital signals, conveyed via a communication medium, such as a network and/or a wireless link, such as those that may be implemented via network interface 940. Portions or all of multiple computing devices, such as those illustrated in FIG. 9, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
one or more memories having stored thereon computer-readable instructions that, upon execution by a computing device, cause the system at least to:
receive information indicative of one or more objects associated with a current state of a workflow, the workflow comprising a current activity corresponding to the current state and a plurality of additional activities, wherein an order of performing the plurality of additional activities is not specified by the workflow;

receive information indicative of a rule, the rule comprising an a first clause, a second clause, and a third clause related by logical AND operators; and send an indication to perform a first activity selected from the plurality of additional activities, wherein the first activity is performed on at least one computing node based at least in part on the indication, wherein the first activity is selected based at least in part on a determination that:

at least one of a first plurality of conditions of the first clause is satisfied by evaluating the first plurality of conditions based at least in part on the information indicative of the one or more objects associated with the current state;

all of a second plurality of conditions of the second clause are satisfied by evaluating the second plurality of conditions based at least in part on the information indicative of the one or more objects associated with the current state; and none of a third plurality of conditions of the third clause are satisfied by evaluating the third plurality of conditions based at least in part on the information indicative of the one or more objects associated with the current state.

2. The system of claim 1, further comprising one or more memories having stored thereon computer-readable instructions that, upon execution by the computing device, cause the system at least to:

receive information indicative of a mapping between the rule and an activity to be performed if the rule is satisfied.

3. The system of claim 1, further comprising one or more memories having stored thereon computer-readable instructions that, upon execution by the computing device, cause the system at least to:

evaluate a condition of the first plurality of conditions based at least in part on comparing a first set of properties of an object associated with the condition to a second set of properties associated with an object of the one or more objects.

4. The system of claim 1, further comprising one or more memories having stored thereon computer-readable instructions that, upon execution by the computing device, cause the system at least to:

determine that the rule corresponds to the current state of the workflow based on at least in part on a workflow identifier and an activity identifier.

5. A computer-implemented method of processing an unordered workflow, the method comprising:

receiving information indicative of one or more objects associated with a state of a workflow, the workflow comprising a plurality of activities, wherein an order of performing the plurality of activities is not specified by the workflow;

determining that at least one condition of a first clause of a rule is satisfied, that all conditions of a second clause of the rule are satisfied, and that no condition of a third clause of the rule is satisfied, the determining made with respect to the one or more objects associated with the state of the workflow; and sending an indication to perform a first activity selected from the plurality of activities, the first activity selected based at least in part on determining that the first, second, and third clauses are satisfied, wherein the activity is performed on at least one computing node based at least in part on the indication.

6. The method of claim 5, wherein evaluating a condition comprises comparing a first value associated with a first property of the condition to a second value of a second property of an object of the one or more objects associated with the state of the workflow, the first property corresponding to the second property.

7. The method of claim 5, wherein a condition comprises a representation of an object, the representation of the object comprising information indicative of a name of a property and at least one value of the property.

8. The method of claim 5, further comprising:

determining that the rule corresponds to the state of the workflow based on at least in part on a workflow identifier, and an activity identifier.

9. The method of claim 5, further comprising:

determining that at least one condition of the first clause is satisfied, that all conditions of the second clause are satisfied, and that no condition of the third clause is satisfied, the determining made with respect to a second one or more objects associated with a prior state of the workflow.

10. The method of claim 9, wherein the determining is made with respect to all prior states of the workflow.

11. The method of claim 5 wherein at least one condition associated with the rule comprises a partial representation of an object of the one or more objects.

12. The method of claim 5, wherein sending the indication to perform the first activity comprises transmitting information indicative of the first, second, and third clauses being satisfied.

13. A non-transitory computer-readable storage medium having stored thereon instructions that, upon execution by one or more computing devices, cause the one or more computing devices at least to:

receive information indicative of one or more objects associated with a state of a workflow comprising a plurality of activities; and causing a first activity to be performed on at least one computing node, wherein the first activity is selected to be performed based at least in part on a determination that:

at least one of a first plurality of conditions of a first clause of a rule is satisfied by evaluating the first plurality of conditions with respect to the one or more objects associated with the state of the workflow;

all of a second plurality of conditions of a second clause of the rule are satisfied by evaluating the second plurality of conditions with respect to the one or more objects associated with the state of the workflow; and none of a third plurality of conditions of a third clause of the rule are satisfied by evaluating the third plurality of conditions with respect to the one or more objects associated with the state of the workflow.

14. The non-transitory computer-readable storage medium of claim 13, wherein evaluating a condition comprises comparing a first value associated with a first property of the condition to a second value of a second property of an object of the one or more objects associated with the state of the workflow, the first property corresponding to the second property.

15. The non-transitory computer-readable storage medium of claim 13, comprising further instructions that, upon execution by the one or more computing devices, cause the one or more computing devices to at least:
   determine that the rule corresponds to the state of the workflow based on at least in part on a workflow identifier, and an activity identifier.

16. The non-transitory computer-readable storage medium of claim 13, comprising further instructions that, upon execution by the one or more computing devices, cause the one or more computing devices to at least:
   determine that at least one condition of the first clause is satisfied, that all conditions of the second clause are satisfied, and that no condition of the third clause are satisfied, the determining made with respect to a second one or more objects associated with a prior state of the workflow.

17. The non-transitory computer-readable storage medium of claim 13, wherein the determining is made with respect to all prior states of the workflow.

18. The non-transitory computer-readable storage medium of claim 13, comprising further instructions that, upon execution by the one or more computing devices, cause the one or more computing devices to at least:
   evaluate at least one condition of the first, second, and third plurality of conditions based at least in part on comparing a first set of properties of an object associated with the condition to a second set of properties associated with an object of the one or more objects.

19. The non-transitory computer-readable storage medium of claim 13, wherein the workflow does not contain ordering information for the plurality of activities.

20. The non-transitory computer-readable storage medium of claim 13, comprising further instructions that, upon execution by the one or more computing devices, cause the one or more computing devices to at least:
   determine to perform a first activity based at least in part on a mapping from the rule to the activity.

\* \* \* \* \*